(12) United States Patent
Anderson et al.

(10) Patent No.: US 12,081,250 B2
(45) Date of Patent: Sep. 3, 2024

(54) DIRECT DIGITAL CHANNELIZER REPEATER

(71) Applicant: Wilson Electronics, LLC, St. George, UT (US)

(72) Inventors: Dale Robert Anderson, Colleyville, TX (US); Christopher Ken Ashworth, Toquerville, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 17/527,105

(22) Filed: Nov. 15, 2021

(65) Prior Publication Data

US 2022/0158671 A1    May 19, 2022

Related U.S. Application Data

(60) Provisional application No. 63/113,684, filed on Nov. 13, 2020.

(51) Int. Cl.
*H04B 1/04* (2006.01)
*H04B 1/10* (2006.01)

(52) U.S. Cl.
CPC ......... *H04B 1/0483* (2013.01); *H04B 1/1036* (2013.01); *H04B 2001/0408* (2013.01); *H04B 2001/1063* (2013.01)

(58) Field of Classification Search
CPC ............ H04B 7/15535; H04B 7/15542; H04B 7/15528; H04B 7/155; H04B 1/0057; H04B 7/15585; H04B 7/15557; H04B 7/15564; H04B 1/10; H04B 7/15507; H04B 1/3877; H04B 7/1555; H04B 1/40; H04B 7/15578; H04B 17/318; H04B 17/40; H04B 7/15; H04B 7/15571; H04B 1/38; H04B 7/0413;
(Continued)

(56) References Cited

U.S. PATENT DOCUMENTS

2003/0067997 A1*   4/2003  Kintis ............... H04L 25/03038
                                                            375/329
2004/0160376 A1*   8/2004  Hornsby ............ H04B 7/15571
                                                            343/770
(Continued)

OTHER PUBLICATIONS

Zinwell Corporation, dCSS module, as accessed Mar. 15, 2022, https://www.zinwell.com.tw/us/satellite-terrestrial/dcss1/dcss-module, Taiwan.

*Primary Examiner* — Golam Sorowar
(74) *Attorney, Agent, or Firm* — Thorpe North & Western LLP

(57) ABSTRACT

A technology is described for a repeater architecture having a combined direct digital channelizer (DDC). The DDC can be coupled to a signal combiner and a breakout signal divider to enable bidirectional signals to be communicated to the DDC. A first direction receive amplification and filtering path can be coupled between a first antenna port and the signal combiner. A second direction receive amplification and filtering path can be coupled between a second antenna port and the signal combiner. A first direction transmit amplification and filtering path can be coupled between the breakout signal divider and the first antenna port. A second direction transmit amplification and filtering path can be coupled between the breakout signal divider and the second antenna port.

12 Claims, 14 Drawing Sheets

(58) Field of Classification Search
CPC .... H04B 1/005; H04B 1/0475; H04B 17/336; H04B 7/14; H04B 7/2606; H04B 1/0053; H04B 1/0064; H04B 2001/0425; H04B 7/04; H04B 1/00; H04B 1/0028; H04B 1/0483; H04W 16/26; H04W 84/047; H04W 52/52; H04W 88/04; H04W 88/085; H04W 52/46; H04W 16/14; H04W 88/08; H04W 24/08; H04W 72/21; H04W 52/16; H04W 52/241; H04W 52/243; H04W 52/245; H04W 52/367; H04W 84/12; H04W 88/06; H04W 40/12; H04W 52/0206; H04W 52/0229; H04W 52/0277; H04W 64/003; H04W 72/0453; H04W 74/0808; H04W 8/005; H04W 12/037; H04W 16/28; H04W 24/02; H04W 24/04; H04W 24/10; H04W 40/22; H04W 52/18; H04L 5/14; H04L 5/1469; H04L 27/367; H04L 27/0002; H04L 5/003; H04L 5/143; H04L 5/1438; H04L 25/03159; H04L 27/2601; H04L 27/2623; H04L 41/0823; H04L 49/25; H04L 5/0053; H04L 5/1461; H04L 1/0025; H04L 12/10; H04L 43/028; H04L 43/16; H04L 5/0023; H04L 5/0048; H04L 9/14

See application file for complete search history.

(56) References Cited

U.S. PATENT DOCUMENTS

| | | | |
|---|---|---|---|
| 2014/0266425 A1* | 9/2014 | Ashworth | H04B 7/15535 330/147 |
| 2020/0358501 A1* | 11/2020 | Hormis | H04B 7/026 |
| 2020/0382208 A1* | 12/2020 | Hormis | H04B 7/2041 |

* cited by examiner

DIRECT DIGITAL CHANNELIZER REPEATER

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
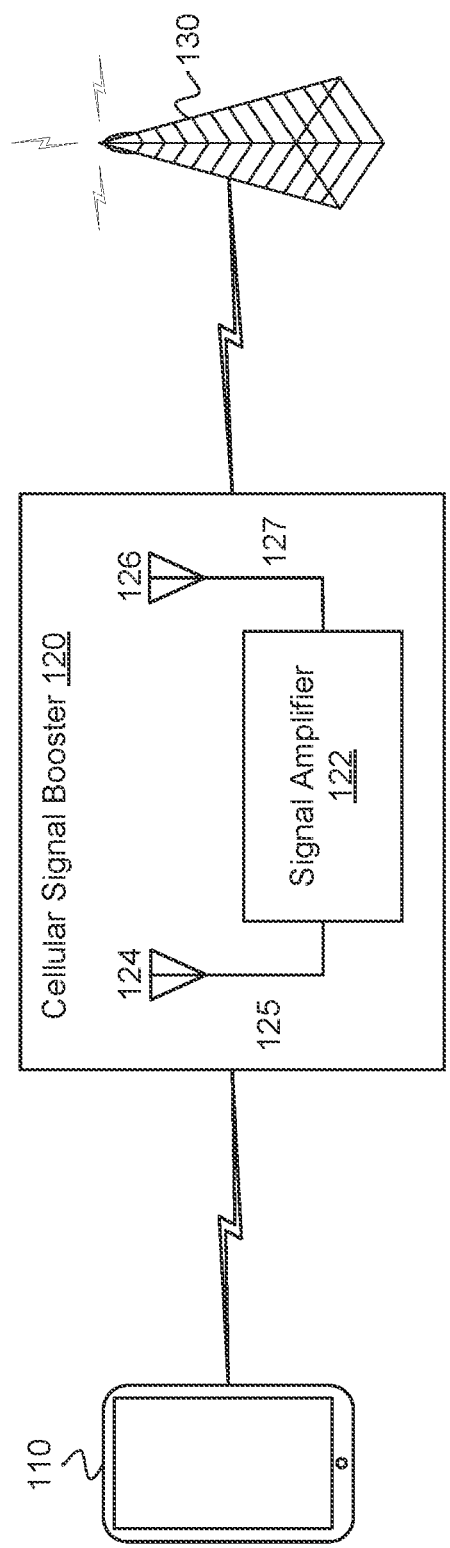
FIG. 1 illustrates a repeater in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Repeaters can increase the quality of wireless communication between a wireless device and a wireless communication access point by amplifying, filtering, or applying other processing techniques to uplink and downlink signals communicated between the wireless device and the wireless communication access point.

Cellular communication standards have become more complex with each additional generation. As the use of wireless handsets have become more popular, government entities have provided significantly more bandwidth. The bandwidth is typically provided in selected frequency bands. The Third Generation Partnership Project (3GPP) standard now lists over 255 different bands that can be used at locations around the world.

Cellular repeaters are following the trend of the cellular communications standards. The repeaters are also more complex in order to provide the desired amplification and filtering for the different bands. However, the increased complexity can increase the cost and power of a repeater. New repeater designs and architectures are needed to provide relatively low cost repeaters for consumers that can provide the amplification and filtering of the bands often used by consumers.

One option to enable a cellular repeater to amplify and filter numerous different cellular bands is through the use of digital filtering. Digital filters can provide sharper filter cutoffs and greater flexibility than traditional analog filters. Unfortunately, digital filtering can be fairly expensive. Traditional digital filtering typically involves the use of multiple synthesizers, downconverters, and upconverters to digitally filter radio frequency signals. A radio frequency signal is can be down converted to an intermediate frequency and/or baseband frequency level. The baseband signal is then converted from analog to digital, filtered, converted back to analog, and then upconverted to an intermediate frequency and then back to the radio frequency that can be transmitted. The use of the synthesizers, upconverters, downconverters, digital processors, and so forth can become prohibitively complex and expensive when multiple bands are considered.

More recently, as computer chips have become faster at processing data and capable of operating at higher frequencies, it has become possible to convert a radio frequency signal directly to a digital signal, which can then be filtered and then converted back to an RF signal. The use of fast computer chips can reduce the number of components used in digital filtering. However, specialized computer chips that are capable of directly converting radio frequency signals to digital signals for filtering are also relatively expensive. A multiband repeater can have from 4 to 10 or more different amplification and filtering paths, including uplink paths and downlink paths for each band and/or channel. The cost of using the fast computer chips on each amplification and filtering path can be cost prohibitive.

FIG. 1 illustrates an exemplary repeater 120 in communication with a wireless device 110 and a base station 130. The repeater 120 can be referred to as a signal booster. A repeater can be an electronic device used to amplify (or boost) signals. The repeater 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the repeater 120 can amplify or boost uplink signals and/or downlink signals bi-directionally. In one example, the repeater 120 can be at a fixed location, such as in a home or office. Alternatively, the repeater 120 can be attached to a mobile object, such as a vehicle or a wireless device 110.

In one configuration, the repeater 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the repeater 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the repeater 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of VVWAN access point.

In one configuration, the repeater 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the repeater 120 can automatically power down or cease amplification when the wireless device 110 approaches a particular base station. In other words, the repeater 120 can determine to stop performing signal amplification when the quality of uplink and/or downlink signals is above a defined threshold based on a location of the wireless device 110 in relation to the base station 130.

In one example, the repeater 120 can include a battery to provide power to various components, such as the signal amplifier 122, the integrated device antenna 124 and the integrated node antenna 126. The battery can also power the wireless device 110 (e.g., phone or tablet). Alternatively, the repeater 120 can receive power from the wireless device 110.

In one configuration, the repeater, also referred to as a repeater 120, can be a Federal Communications Commission (FCC)-compatible consumer repeater. As a non-limiting example, the repeater 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 120 can improve the wireless connection between the wireless device 210 and the base station 230 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 120 can boost signals for 3GPP LTE Release 16.7.0 (October 2020) or other desired releases.

The repeater 120 can boost signals from the 3GPP Technical Specification (TS) 36.101 (Release 16.7.0 October 2020) bands, referred to as LTE frequency bands. For example, the repeater 120 can boost signals from one or more of the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V16.1.0 (March 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1A.
NOTE 5:
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the repeater 120 can boost signals from the 3GPP Technical Specification (TS) 38.104 (Release 16.5.0 October 2020) bands, referred to as 5G frequency bands. In addition, the repeater 120 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.5.0 (October 2020), and depicted in Table 2 and Table 3:

TABLE 2

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 3

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The number of 3GPP LTE or 5G frequency bands and the level of signal improvement can vary based on a particular wireless device, cellular node, or location. Additional domestic and international frequencies can also be included to offer increased functionality. Selected models of the repeater 120 can be configured to operate with selected frequency bands based on the location of use. In another example, the repeater 120 can automatically sense from the wireless device 110 or base station 130 (or GPS, etc.) which frequencies are used, which can be a benefit for international travelers.

In one example, the repeater can be configured to transmit a downlink (DL) signal in a millimeter wave (mm Wave) frequency range, and transmit an uplink (UL) signal in a sub-6 gigahertz (GHz) frequency range. In this example, a mm Wave frequency range can be a frequency between 6 GHz and 300 GHz.

In one configuration, multiple repeaters can be used to amplify UL and DL signals. For example, a first repeater can be used to amplify UL signals and a second repeater can be used to amplify DL signals. In addition, different repeaters can be used to amplify different frequency ranges.

In one configuration, the repeater 120 can be configured to identify when the wireless device 110 receives a relatively strong downlink signal. An example of a strong downlink signal can be a downlink signal with a signal strength greater than approximately −80 dBm. The repeater 120 can be configured to automatically turn off selected features, such as amplification, to conserve battery life. When the repeater 120 senses that the wireless device 110 is receiving a relatively weak downlink signal, the integrated booster can be configured to provide amplification of the downlink signal. An example of a weak downlink signal can be a downlink signal with a signal strength less than −80 dBm.

Figure 2:
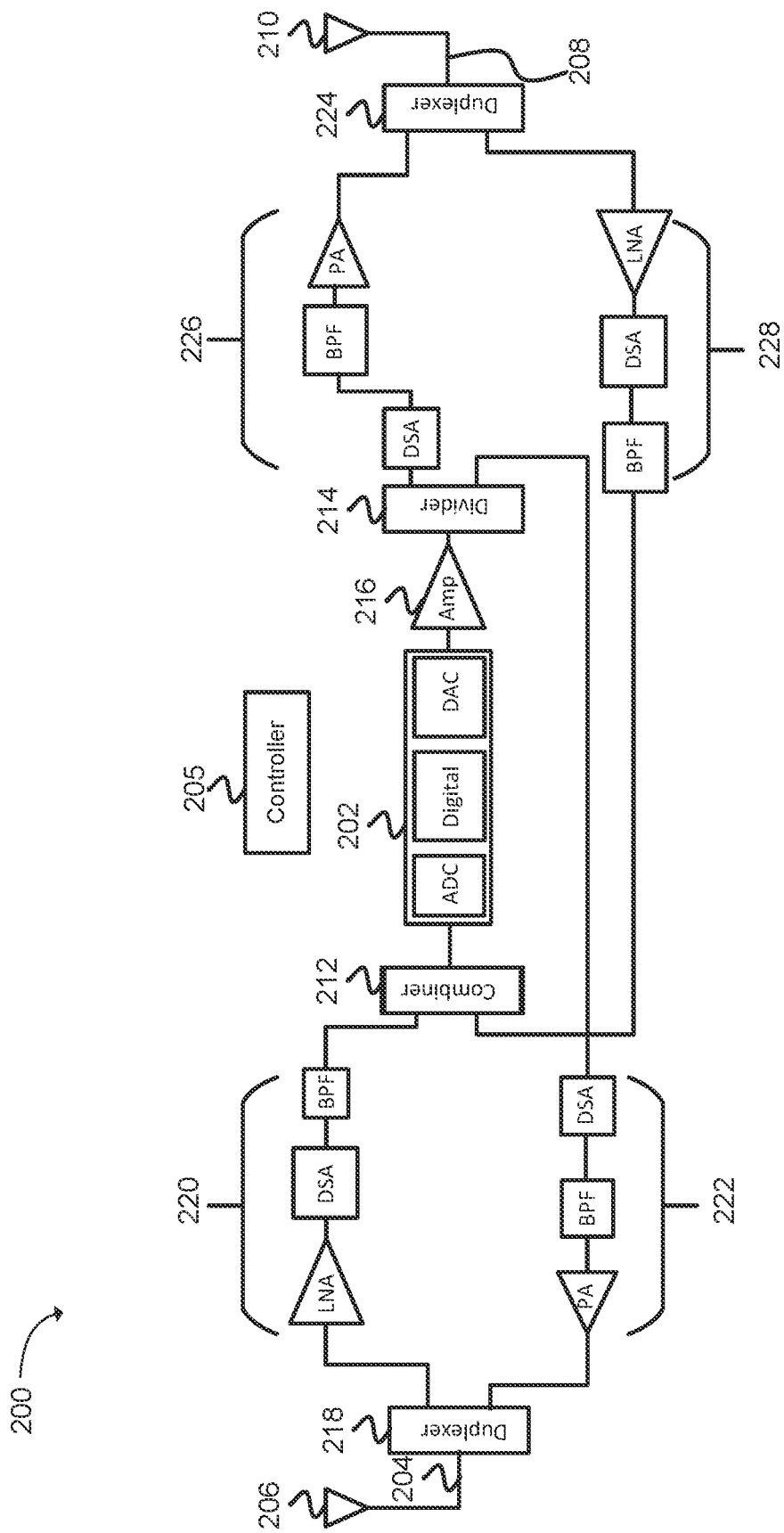
FIG. 2 illustrates a repeater having a combined direct digital channelizer (DDC) in accordance with an example.

FIG. 2 provides an example illustration of a repeater 200 that includes a direct digital channelizer 202. The direct digital channelizer (DDC) 202 is configured to receive a radio frequency (RF) signal at an input of a high speed analog to digital converter (ADC) and convert the RF signal to a digital signal. The digital signal can then be sent to a digital processor, where the digitized signal can be filtered and digitally manipulated as desired. One or more digital filters can be applied to the digital signal. The digital filters can be used to filter out unwanted noise in the signal, and extraneous noise outside of the signal band. The signal band can include multiple different channels. Using digital filters, the digitized RF signal can be channelized. The RF band or channelized signal can be shaped with a desired filter roll off. In addition, the digital processor can also apply amplitude equalization to each of the channelized filters. The processed digital signal can then be sent to a high speed digital to analog converter (DAC) that can directly convert the digitized signal back to an RF signal. The digitally filtered channels may be interleaved at the DAC output.

In one embodiment, the digital processor in the DDC 202 can be configured to process a plurality of different digitized radio frequency signals in parallel. In one example, this allows multiple different channels in a band to be have filtering and amplitude equalization performed substantially simultaneously. Alternatively, multiple digitized signals in different RF bands can be input into the DDC. The digitized RF signals can have filtering and/or amplitude equalization performed substantially simultaneously. As used herein, the term substantially simultaneously is intended to refer to parallel processing that occurs in a chip within a set amount of time. To an end user, the signals appear to be processed simultaneously.

Examples of a DDC that can directly convert an RF signal to a digital signal, provide filtering, and then convert the filtered signal directly back to an RF signal include the MaxLinear Quad XLB Input Digital Satellite Channel Stacking Switch, and the D-Smart Digital Channel Stacking Solution. The term "stacking" refers to changing a band of a signal from the frequency it is received at to a separate frequency when it is converted back to RF. It is often used to receive satellite signals and convert them to different frequencies, such as frequencies that can be used for a cable set top box. Stacking of signals is not typically used in a repeater, since a repeater is configured to output a signal with the same frequency that the signal is received at. The examples provided are not intended to be limiting. Other chips with a high speed ADC, digital processor, and DAC can also be used.

FIG. 2 illustrates an example architecture that can be used to enable a bidirectional repeater to use a single DDC 202 that can filter and/or apply amplitude equalization of multiple signals. In this example, the architecture enables a DDC to receive bidirectional signal(s) that can be filtered and equalized substantially simultaneously.

For instance, an uplink signal can be received at a first antenna port 204. The antenna port 204 is configured to be coupled to a first antenna 206. In this example, the first antenna 206 can transmit and receive frequency division duplex (FDD) or time division duplex (TDD) signals. These signals can be communicated to/from the first antenna 206 to the first antenna port 204 of the repeater 200.

In one example, the first antenna port 204 can be configured to be coupled to a server antenna. The server antenna can receive a first-direction signal (e.g., an uplink signal) from a wireless device (e.g., a UE), and transmit a second-direction signal (e.g. a downlink signal) to the wireless device.

A downlink signal can be received at a second antenna port 208 that is configured to be coupled to a second antenna 210. The second antenna can also transmit and receive FDD or TDD signals that can be communicated to/from the second antenna 210 to the second antenna port 208 of the repeater 200. The repeater may include the antennas 206, 210. Alternatively, the repeater may be configured to be coupled to the antennas, and the antennas may be purchased separately.

In the example, the second antenna port 208 can be configured to be coupled to a donor antenna. The donor antenna can receive a second direction signal (e.g. a downlink signal) from a base station, and transmit a first direction signal (e.g. an uplink signal) that is received at the repeater, to the base station.

The repeater 200 can include a signal combiner (SC) 212. The signal combiner 212 can include any type of radio frequency signal direction device, such as a signal splitter, a duplexer, a multiplexer, or a circulator. For example, a signal combiner can be used to route multiple signals to the input of a high speed analog to digital converter (ADC) in the DDC 202. Additional bandpass filtering may be used if a splitter or multiplexer is used in place of a duplexer. Alternatively, the signal combiner 212 can be a duplexer or multiplexer with internal filtering.

The SC 212 can include a SC first input port that is coupled to the first antenna port 204 and a SC second input port that is coupled to the second antenna port 208. A SC output port can be configured to send a first RF signal (i.e. an uplink signal or downlink signal) from the first antenna port and a second RF signal (i.e. a downlink signal or uplink signal) from the second antenna port to the DDC 202. Accordingly, the first and second RF signals have different directions (uplink or downlink).

As previously discussed, the DDC 202 can include a high speed analog to digital converter (ADC) having an ADC input that is coupled to the SC output port and an ADC output. The ADC is configured to directly sample the first RF signal and the second RF signal to form a combined digital signal.

The DDC 202 further includes a digital processor having a processor input coupled to the ADC output and a processor output. The digital processor is configured to process the combined digital signal. The processing can include applying digital filters to the combined digital signal. The digital filters can be used to filter a selected band, such as a 3GPP band. Alternatively, the digital filters can be configured to filter selected channel(s) in the 3GPP band or other desired RF band. The digital processor can be configured to output information regarding the first RF signal, the second RF signal, and/or selected channels in the first and second RF signals. The information can include, but is not limited to, frequency information, amplitude information, and timing information regarding the bands or channels in the first RF signal and the second RF signal. The DDC can also measure a channel power and apply automatic level control (ALC) to the channel's output power.

The DDC 202 further includes a digital to analog converter (DAC) with a DAC input coupled to the digital processor output and a DAC output port that is configured to convert the processed combined digital signal to a processed first RF signal and a processed second RF signal. In this example, the processed first RF signal can be a processed uplink signal, and the processed second RF signal can be a downlink signal, or vice versa.

The repeater 200 can further include a breakout signal divider (BSD) 214. The breakout signal divider 214 can include any type of radio frequency signal direction device, such as a signal splitter, a duplexer, a multiplexer, or a circulator. For example, a signal splitter can be used to route the output of the DAC in the DDC 202 to the first direction transmit amplification and filtering path 226 or the second direction transmit amplification and filtering path 222. Additional bandpass filtering may be used if a splitter or multiplexer is used in place of a duplexer. Alternatively, the BSD 214 can be a duplexer or multiplexer with internal filtering.

The processed first RF signal and processed second RF signal can be directed by the breakout signal divider 214 to the first antenna port 204 for transmission at the first antenna 206, or to the second antenna port 208 for transmission at the second antenna 210. The BSD 214 can include a BSD input port coupled to the DAC output port of the DDC 202. A BSD first output port can be coupled to the second antenna port 208 that is configured to send the processed first RF signal for transmission at the second antenna. A BSD second output port can be coupled to the first antenna port 204 that is configured to send the processed second RF signal for transmission at the first antenna.

The repeater 200 has a unique architecture with the use of the SC duplexer 212 and the BSD 214 located before and after the DDC 202. Duplexers are typically used at the front end of radio frequency electronics. In this example, the duplexers allow a single DDC 202 to be used with bidirectional signals.

The repeater 200 can further comprise an RF amplifier 216 that is coupled between the DAC output port of the DDC 202 and the BSD input port of the BSD 214. The RF amplifier 216 can be a low noise amplifier or a power amplifier.

The repeater 200 can further comprise a first antenna duplexer (1AD) 218. The 1AD 218 includes a 1AD output port coupled to the SC 212 first input port; an 1AD input port coupled to the BSD 214 second output port; and a 1AD bidirectional port coupled to the first antenna port 204. The 1AD 218 can be used to direct a first direction signal to the DDC 202, and a second direction signal can be directed to the first antenna port 204 for communication to the first antenna 206 for transmission.

The repeater 200 can further comprise a first direction receive amplification and filtering path 220 coupled between the 1AD 218 output port and the first SC 212 input port. The first direction receive amplification and filtering path 220 can include a low noise amplifier, a variable attenuator, and a bandpass filter. FIG. 2 illustrates a digital signal attenuator (DSA). The DSA can be controlled by a controller 205 that can be used, in part, to set attenuation levels in the repeater 200. For example, the controller 205 can be used to set attenuation levels of each DSA to achieve a desired power level for the signals in the repeater 200. However, any type of variable attenuator can be used.

Alternatively, a variable amplifier can be used with a static attenuator. The first direction receive amplification and filtering path 220 can be used to amplify and filter a signal received at the first antenna port 204 from the first antenna 206. Once the signal is filtered and amplified, it can be sent to the DDC 202 for additional digital filtering. The DDC 202 itself may also have an internal Digital Satellite Equipment Control (DiSEqC) modem which can control the DDC 202 via standard control protocols, such as the EN50494 and EN50607 control protocols over coax cables. The DDC 202 can also be controlled remotely over coax from an external DiSEqC controller. In addition, the DDC 202 can be controlled over a wireless control link. In one example, the DDC 202 can be controlled wirelessly using a DiSEqC messaging protocol. The wireless link can be cellular (3GPP), Wi-Fi, Bluetooth, or another desired type of wireless communication.

The repeater 200 can further comprise a second direction transmit amplification and filtering path 222 coupled between the 1AD 218 input port and the BSD 214 second output port. The second direction transmit amplification and filtering path 222 can include a variable attenuator, a bandpass filter, and a power amplifier. The second direction transmit amplification and filtering path 222 can filter the processed second RF signal when it is output from the DDC 202. The processed second RF signal can then be amplified by a selected amount and sent to the first antenna port 204 for communication to the first antenna 206 for transmission.

The repeater 200 can further comprise a second antenna duplexer (2AD) 224. The 2AD includes a 2AD input port coupled to the BSD 214 first output port, a 2AD output port coupled to the SC 212 second input port, and a 2AD bidirectional port coupled to the second antenna port 208. The 2AD can route 1st direction signals and $2^{nd}$ direction signals to and from the second antenna port 208.

The repeater 200 can further comprise a first direction transmit amplification and filtering path 226 coupled between the first BSD 214 output port and the 2AD 224 input port. The first direction transmit amplification and filtering path can include a variable attenuator, a bandpass filter, and a power amplifier. The first direction transmit amplification and filtering path can be used to filter and amplify a first direction signal before it is sent to the second antenna port 208 for communication to the second antenna 210 for transmission.

The repeater 200 can further comprise a second direction receive amplification and filtering path 228 coupled between the 2AD 224 output port and the second SC 212 input port. The second direction receive amplification and filtering path can include a low noise amplifier, a variable attenuator, and a bandpass filter. The second direction receive amplification and filtering path 228 can be used to amplify and filter a signal received at the second antenna port 208 from the second antenna 210. Once the signal is filtered and amplified, it can be sent to the DDC 202 for additional digital filtering.

In one example, the DDC 202 can be configured to apply a first plurality of filters to the first RF signal. The first plurality of filters can filter the first RF signal over a selected band. Alternatively, the first plurality of signals can form one or more first channelized signals from the first RF signal. The DDC can apply a second plurality of filters to the second RF signal to filter the second RF signal over a second selected band. The band may be the same or different from the first band. The second plurality of filters can also be used to form one or more second channelized signals from the second RF signal.

In another example, the DDC can be configured to apply an amplitude equalization to one or more of the first channelized paths and apply the amplitude equalization to one or more of the second channelized paths.

The example architecture illustrated for the repeater 200 in FIG. 2 allows a single DDC 202 to be used to provide digital filtering for both the uplink signals and the downlink signals that are received and transmitted by the bidirectional repeater 200. The ability to use a single DDC enables the repeater to be relatively inexpensive, low power, and have a high degree of reliability. The use of digital filtering can enable the repeater to be configured for operation in multiple different regions that may use different bands for communication. Because different types of digital filters can be applied at the DDC, the repeater can be used to provide different levels of filtering, depending on the legal requirements of the operating region. Accordingly, the repeater 200 can provide an inexpensive consumer cellular repeater that can be used in a large number of different locations with different transmission bands and communication requirements.

Figure 3:
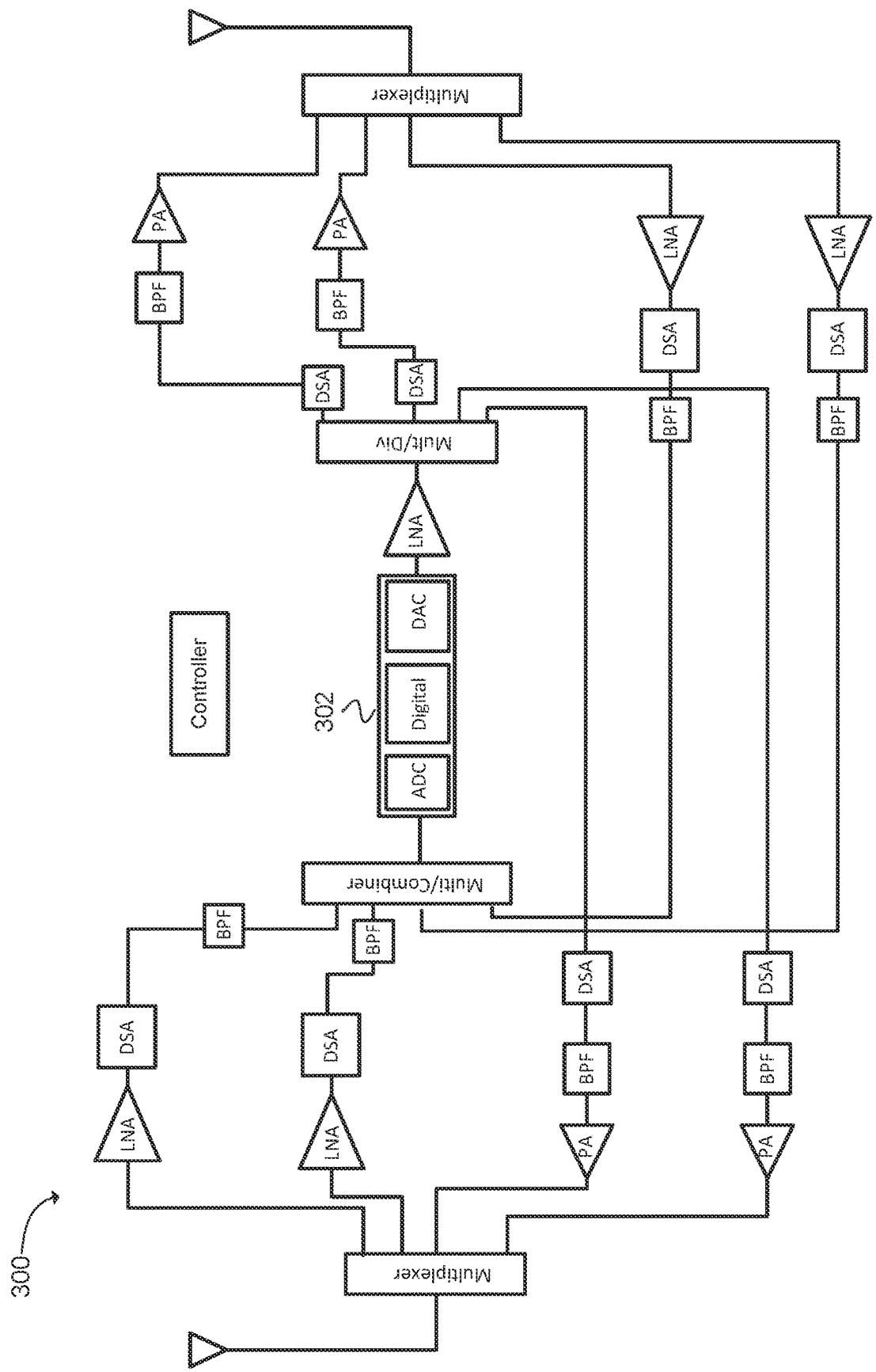
FIG. 3 illustrates a multiband repeater having a combined DDC in accordance with an example.

FIG. 3 provides an additional example architecture for a repeater 300 with a DDC. FIG. 3 illustrates that multiple bands can filtered through the single DDC 302. The multiple bands are routed using signal combiners and signal dividers, such as multiplexers or signal splitters, in place of the 1AD 218, SC 212, BSD 214, and 2AD 224 of FIG. 2. In the example of FIG. 3, two first direction bands and two second direction bands are routed through a multiplexer/signal combiner to the DDC 302 for digital filtering. Additional first direction and second direction bands can also be routed through the DDC 302, depending on the limits of the ADC, digital processor, and DAC. The signals are routed from the DAC in the DDC 302 and through a multiplexer/signal splitter. As electronics continue to be miniaturized, and include more transistors that operate at faster clock frequencies, additional bands can be added to the single DDC. Signal splitters/combiners and bandpass filters can be used in place of the multiplexers.

Figure 4:
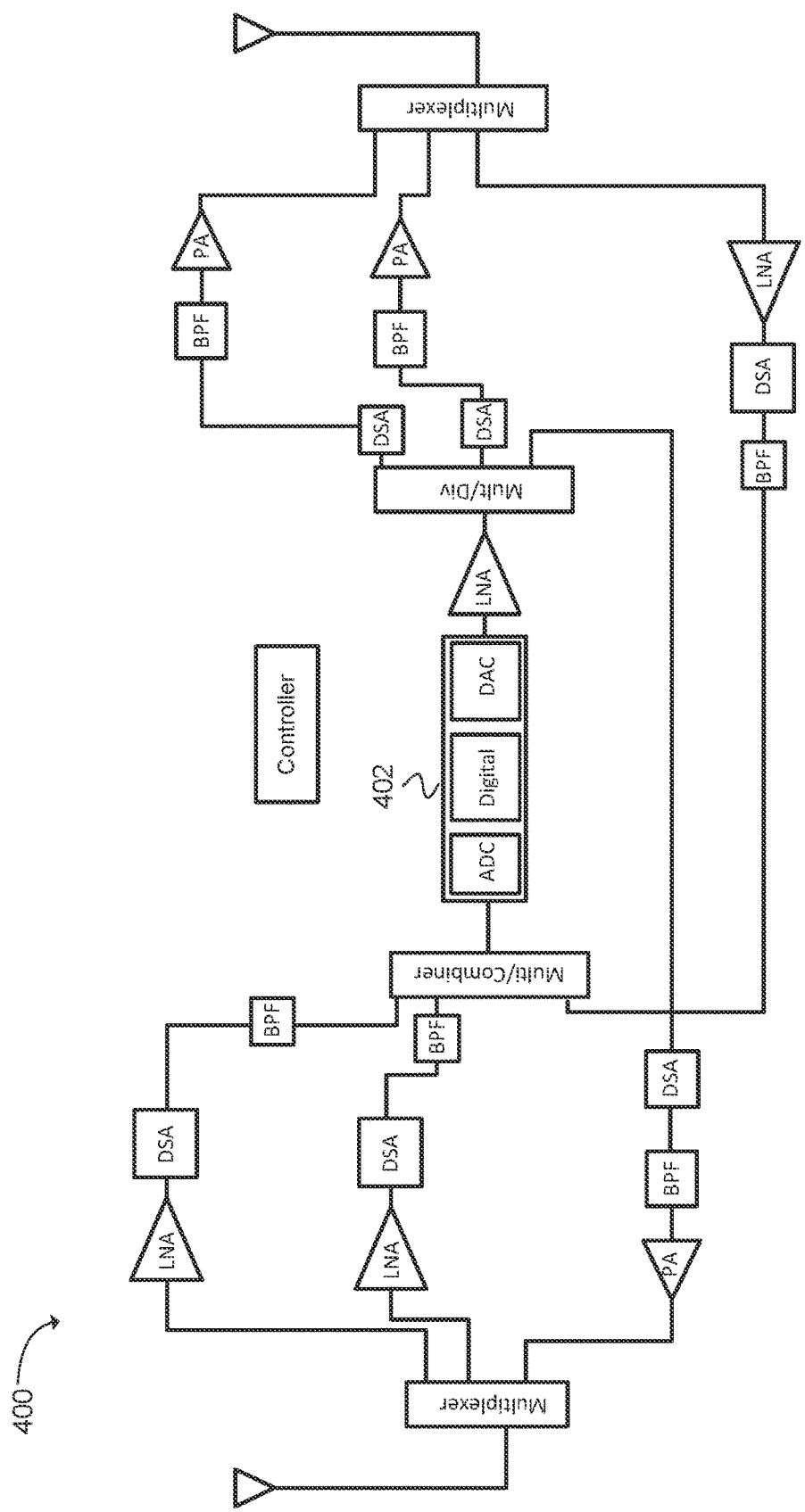
FIG. 4 illustrates a multiband repeater having a combined DDC in accordance with an example.

FIG. 4 provides an example illustration of a repeater 400 in embodiment in which a different number of uplink bands or downlink bands are filtered using a single DDC 402. In this example, there are two first direction paths and one second direction path. The DDC and repeater architecture are not limited to a select number or even number of paths. The repeater 400 can include M first direction paths and N second direction paths, where M and N are positive integers. Signal splitters and bandpass filters can be used in place of the multiplexers.

Figure 5:
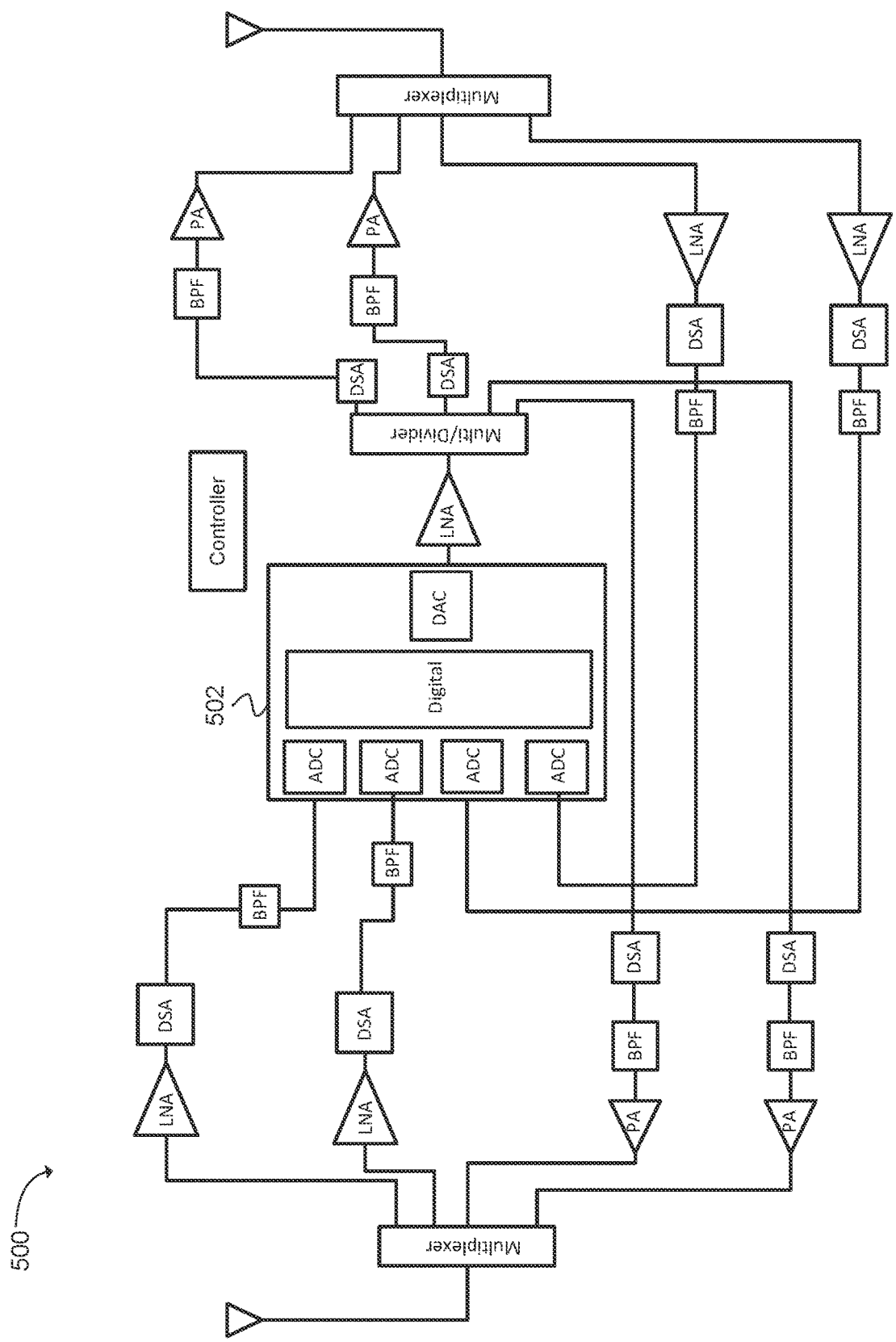
FIG. 5 illustrates a multiband repeater having a combined DDC with separate analog to digital converters (ADCs) in accordance with an example.

FIG. 5 illustrates an example of a repeater 500 with a DDC 502 that includes a separate ADC for each amplification and filtering path. The architecture of FIG. 5 is the same as FIG. 3, with two first direction amplification and filtering paths and two second amplification and filtering paths. Instead of combining the four paths into a signal combiner/multiplexer, each of the paths are coupled to a separate ADC in the DDC 502. As used herein, the term combiner multiplexer can include any type of signal combiner, including a duplexer, a multiplexer, or a signal splitter/combiner as previously discussed. Additional bandpass filtering may be used with a combiner multiplexer.

When a single ADC is used, as illustrated in FIGS. 1-3, there may be limitations on the dynamic range of each of the signals sent to the ADC. Using separate ADCs can provide a cleaner digitized signal input to the digital processor, and eliminates dynamic range concerns from different signal paths with signals having different signal levels. Accordingly, a DDC with separate ADCs can be used in a repeater where significantly different signal levels may be sent to the DDC. However, since each received signal is separately amplified prior to arriving at the DDC, the signals may be substantially equalized to enable the use of a single ADC, as shown in FIGS. 1-3. Signal splitters and bandpass filters can be used in place of the multiplexers.

Figure 6:
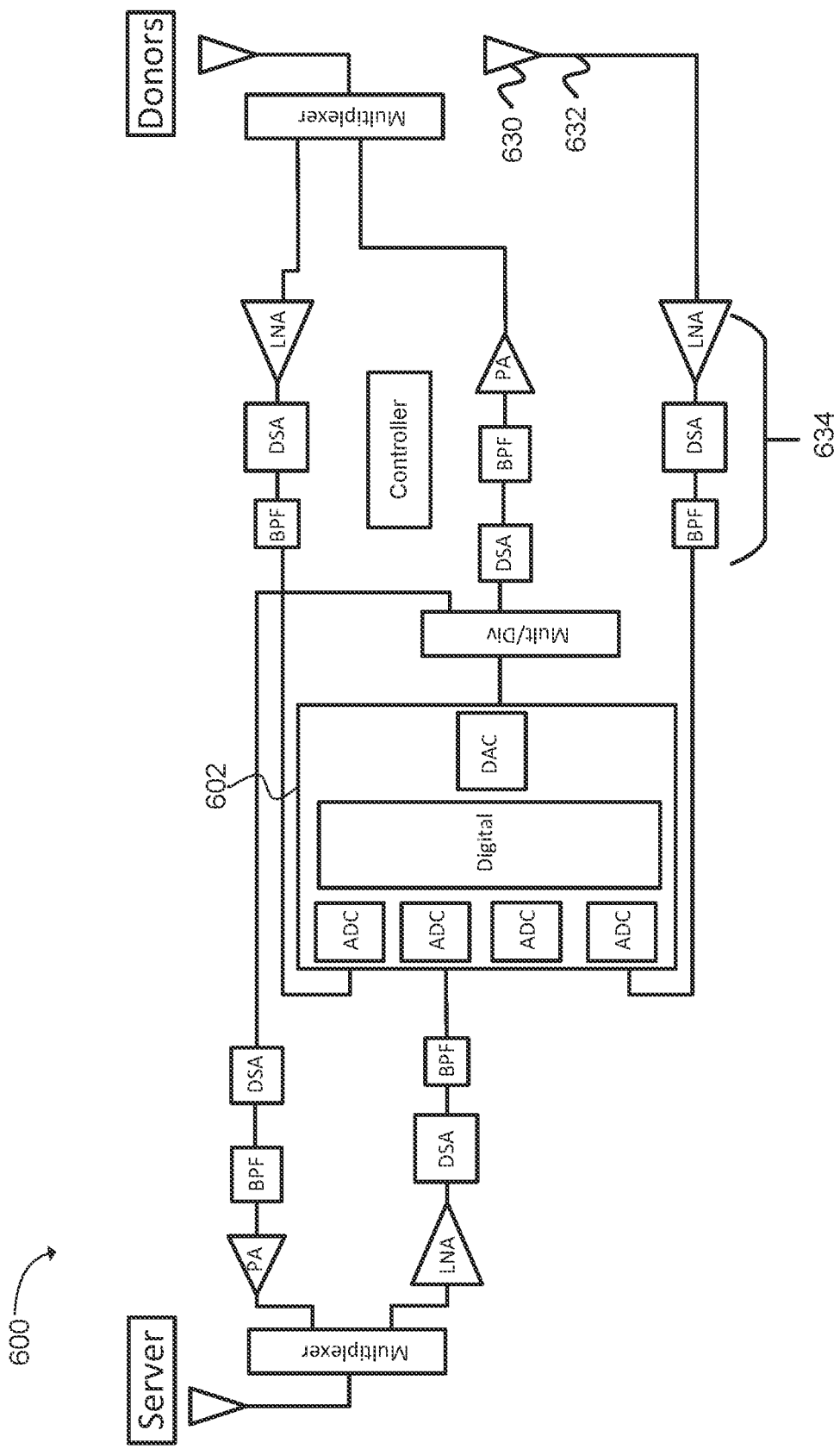
FIG. 6 illustrates a repeater having a combined DDC configured for multiple donor antennas in accordance with an example.

FIG. 6 illustrates an example of a repeater 600 in which a first direction path and a second direction path are coupled to separate ADCs in a DDC 602. In addition, an additional donor antenna 630 is configured to be coupled to an additional ADC in the DDC 602 via a donor antenna port 632 at the repeater 600. In this example, a second direction receive amplification and filtering path 634 is coupled between the donor antenna port 632 and the additional ADC of the DDC 602. While one additional donor port and donor antenna are illustrated in this example, it is not intended to be limiting. N additional donor antennas can be coupled to N donor ports, where N is a positive integer. Each donor port can be coupled to a separate ADC or a multiplexer that is coupled to a single ADC.

In the example of FIG. 6, the received second direction RF signals from each donor port can be measured at the DDC 602. The second direction RF signal that is considered the best (i.e. highest power, lowest noise, best channel characteristics and/or quality, etc.) can be selected and output from the DAC to the server antenna. A fixed first direction (i.e. uplink) signal can be transmitted on 1 of the N donor antennas. Signal splitters and bandpass filters can be used in place of the multiplexers.

Figure 7:
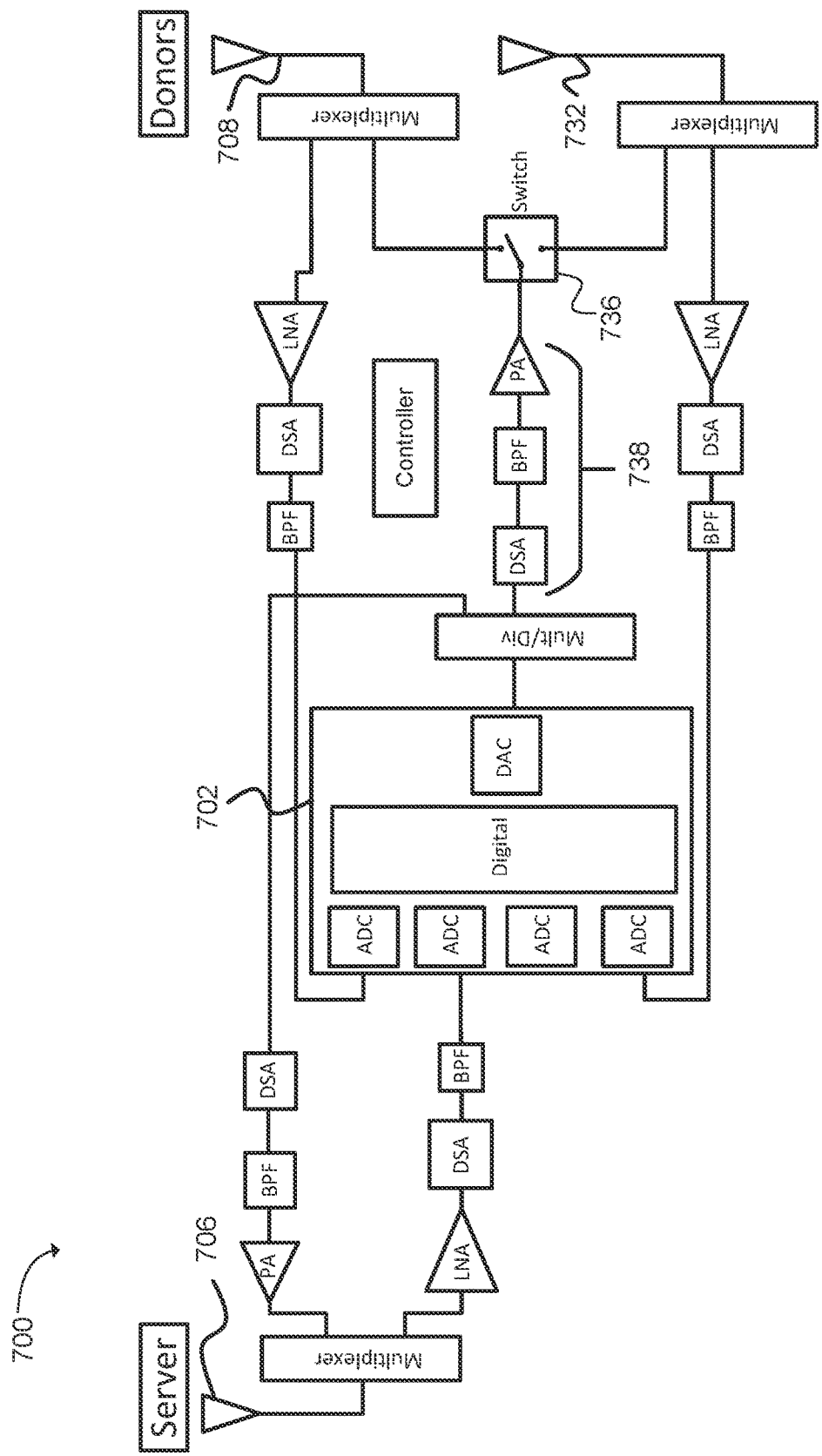
FIG. 7 illustrates a repeater having a combined DDC configured for multiple switched donor antenna amplification and filtering paths in accordance with an example.

FIG. 7 illustrates a similar architecture as FIG. 6, with the addition of a switch 736 that is coupled between the donor antenna ports 708, 732 and a first direction transmit amplification and filtering path 738. In this example, a single server antenna 706. The architecture of the repeater 700 allows a donor antenna to be selected with the switch 736 to provide a switched uplink with a fixed downlink path. While two donor antennas are shown, N donor antennas can be used, where N is a positive number greater than 1. The digital processor in the DDC 702 can be used to provide band and/or channel filtering. The digital processor can statically or dynamically select the best second direction (i.e. downlink) donor antenna port that is coupled to the ADCs to output to the DAC. The first direction signal (i.e. uplink) can be switched statically or dynamically to drive the best downlink donor antenna via the switch 736. In one example, the switch can be a high linearity RF switch. Signal splitters and bandpass filters can be used in place of the multiplexers.

Figure 8:
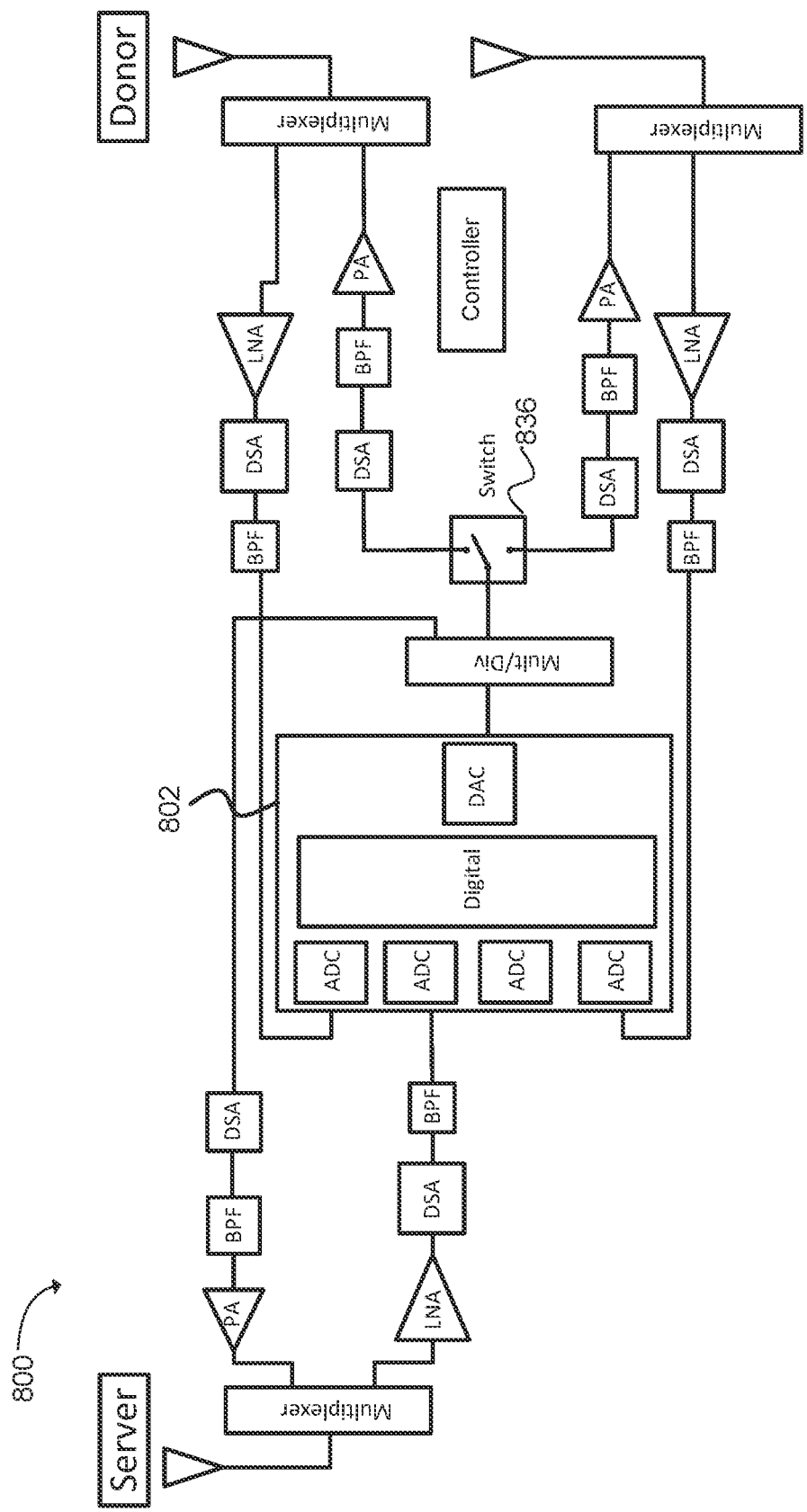
FIG. 8 illustrates a repeater having a combined DDC configured for multiple switched donor antenna amplification and filtering paths in accordance with an example.

FIG. 8 illustrates a repeater 800 with a similar architecture as FIG. 7, with the switch 836 configured to direct a first direction signal to one of the donor antenna ports for communication to a selected donor antenna for transmission. A single server antenna with a selected donor antenna can provide a switched first direction signal (UL) with a fixed second direction signal (DL). As in FIG. 7, N donor antennas can be used, where N is a positive number greater than 1. The digital processor in the DDC 802 can provide band and channel filtering. The DDC 802 can statically or dynamically select a best downlink donor antenna from the signals input into the ADCs to output to the DAC. The first direction signal (i.e. uplink) can be statically or dynamically switched to drive one of the N first direction amplification and filtering paths to a best downlink donor antenna. The RF switch 836 driving the uplink paths can have a lower linearity than the RF switch 736 illustrated in FIG. 7. Signal splitters and bandpass filters can be used in place of the multiplexers.

Figure 9:
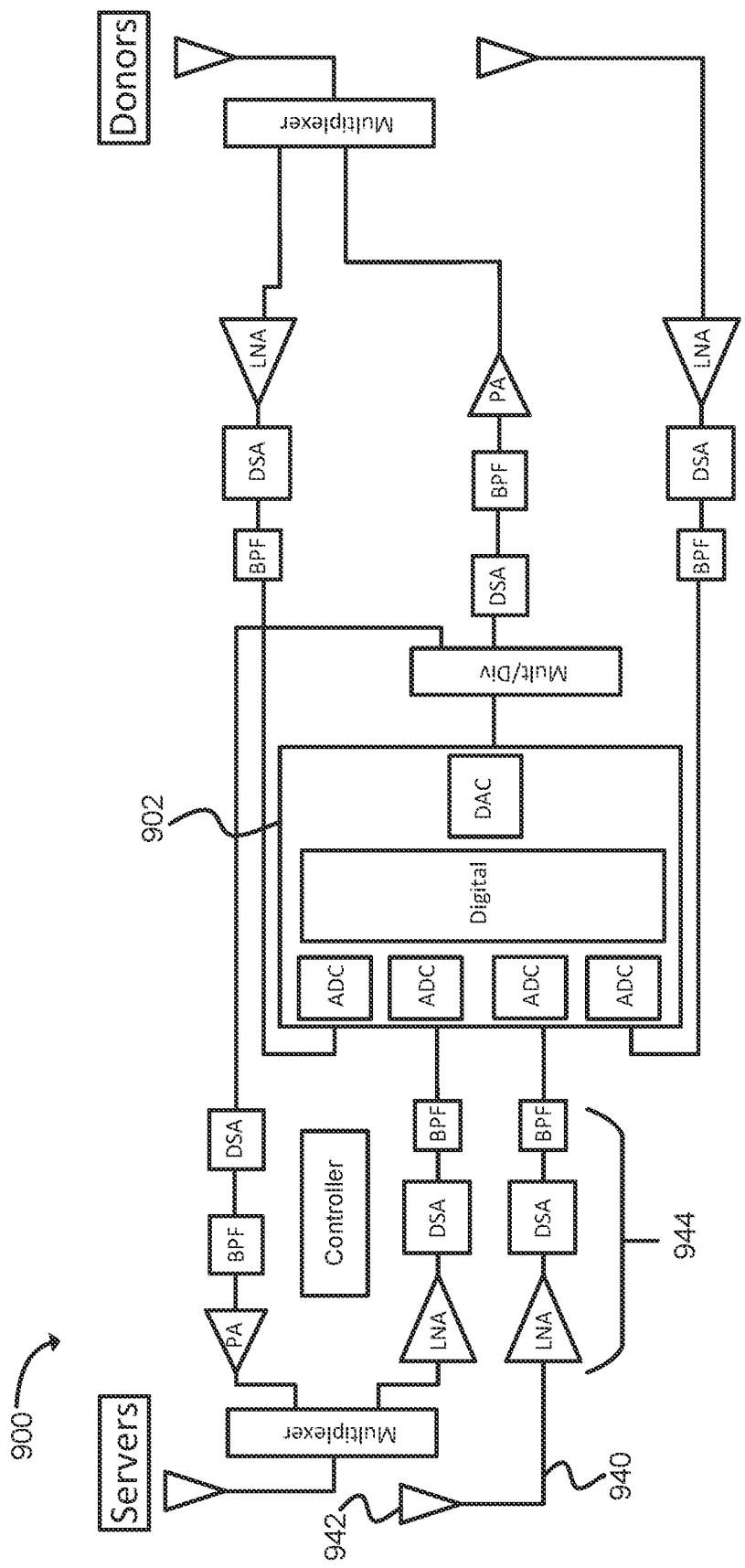
FIG. 9 illustrates a repeater having a combined DDC configured for multiple donor antennas and multiple server antennas in accordance with an example.

FIG. 9 illustrates a repeater 900 with an architecture that is similar to the repeater 600 in FIG. 6, with the addition of another server antenna port 940 configured to be coupled to an additional server antenna 942. The server antenna port 940 is coupled to an ADC of the DDC 902 via a first direction receive amplification and filtering path 944. While a single additional server antenna port is illustrated, this is not intended to be limiting. The repeater 900 can include M server antenna ports configured to be coupled to M server antennas and M ADCs or a multiplexer coupled to a single ADC of the DDC 902. The DDC 902 can provide band and/or channel filtering. With two donor antenna ports and two server antenna ports, the digital processor in the DDC 902 can be configured to select a best DL donor antenna and a best UL server antenna from the inputs to the ADCs and output the selected signal from the DAC. The architecture can provide a fixed UL on 1 of N donor antennas and a fixed downlink on 1 of M server antennas, where M and N are positive integers greater than 1. Signal splitters and bandpass filters can be used in place of the multiplexers.

Figure 10:
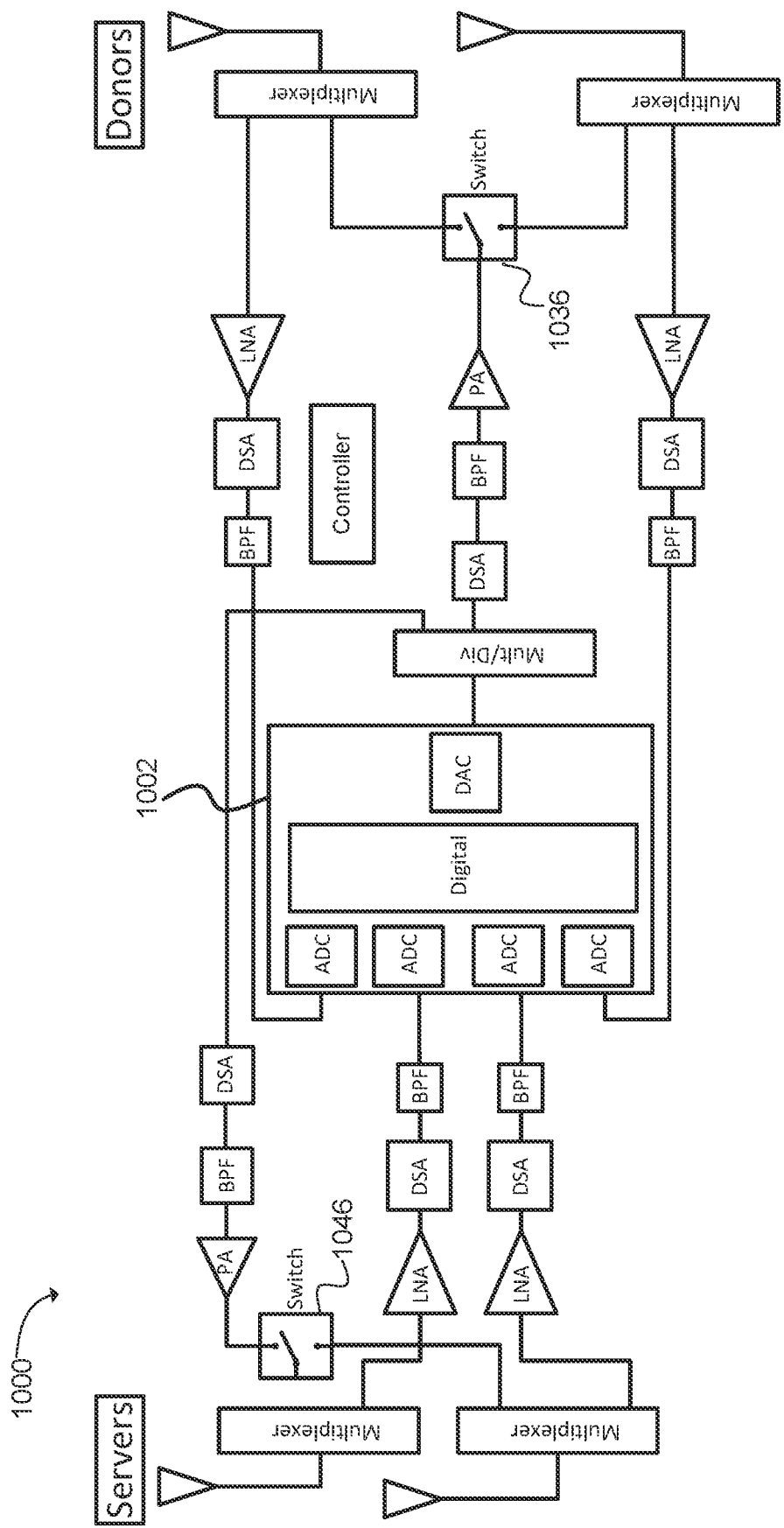
FIG. 10 illustrates a repeater having a combined DDC configured for multiple switched donor antenna amplification and filtering paths and switched server antenna amplification and filtering paths in accordance with an example.

FIG. 10 illustrates a repeater 1000 with an architecture that is similar to FIGS. 9 and 7, with a donor antenna port selection switch 1036 and a server antenna port selection switch 1046, to enable a switched uplink and a switched downlink. While two server antennas and two donor antennas are illustrated, it is not intended to be limiting. M server antennas and N donor antennas can be used, where N and M are positive integers greater than 1. The DDC 1002 can provide band and/or channel filtering. The digital processor in the DDC can statically or dynamically select a best downlink donor and uplink server antenna from the ADC inputs to output to the DAC. The first direction signals (i.e. UL) and second direction signals (i.e. downlink) can be switched statically or dynamically to drive the best downlink donor antennas and uplink server antennas, respectively, via the switches 1036, 1046. The switches can be high linearity RF switches. Signal splitters and bandpass filters can be used in place of the multiplexers.

Figure 11:
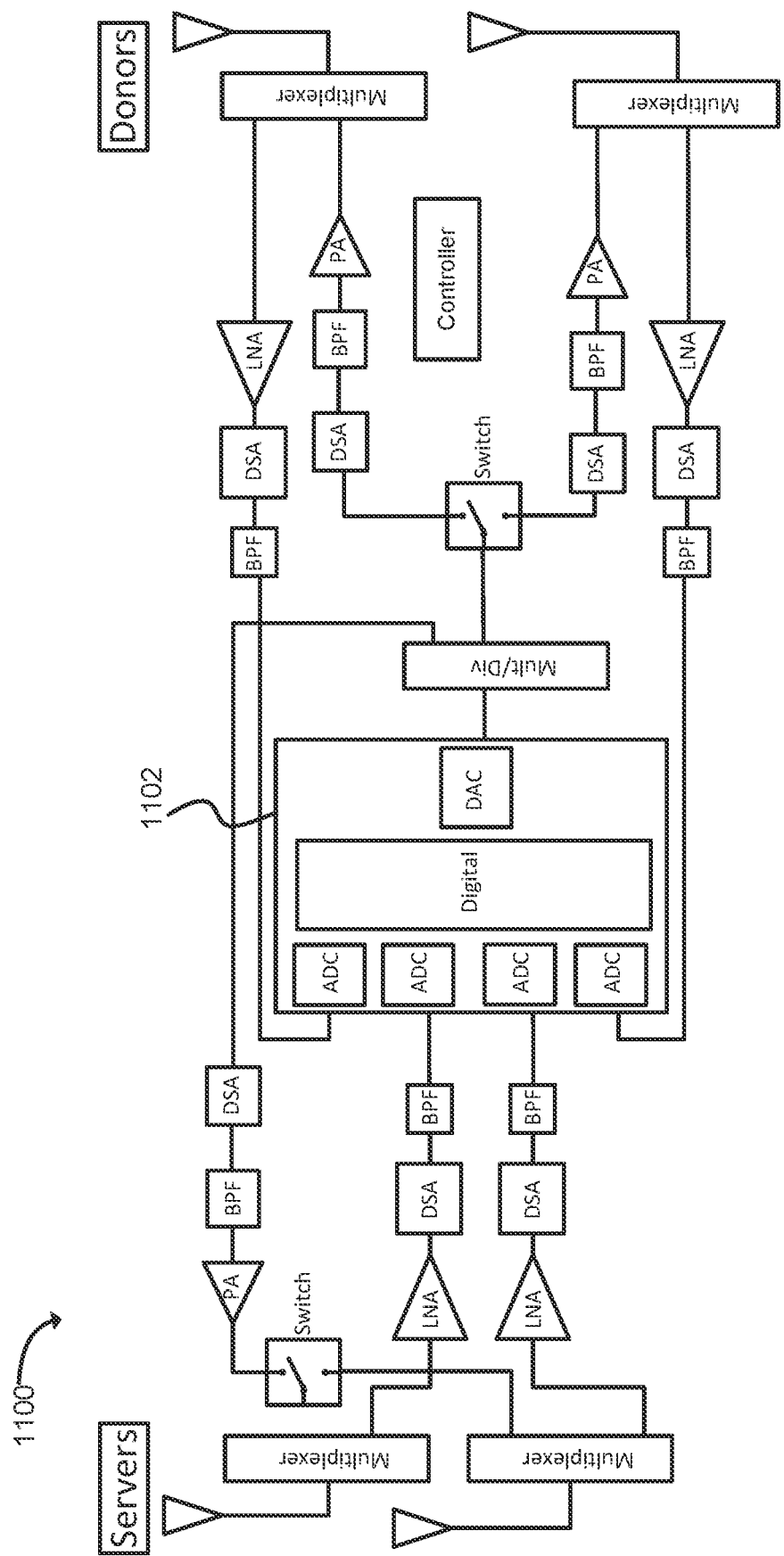
FIG. 11 illustrates a repeater having a combined DDC configured for multiple switched donor antenna amplification and filtering paths and switched server antenna amplification and filtering paths in accordance with an example.

FIG. 11 illustrates a repeater 1100 with an architecture similar to FIG. 8 with the addition of the switchable server antenna port(s). The digital processor in the DDC 1102 can provide band and channel filtering for each signal input to an ADC. The DDC 1102 can statically or dynamically select a best downlink donor antenna and a best uplink server antenna from the signals input into the ADCs to output to the DAC. The best first direction signal (i.e. uplink) can be statically or dynamically switched to drive one of the N first direction amplification and filtering paths to a best downlink donor antenna. Similarly, the best second direction signal (i.e. downlink) can be statically or dynamically switched to drive one of the M second direction amplification and filtering paths to a best uplink server antenna. Signal splitters and bandpass filters can be used in place of the multiplexers.

In each of the examples illustrated in FIGS. 6-11, the signal to noise ratio of the signals can be maximized in the uplink and downlink paths for communication between the UE and the base station via the repeater by connecting the repeater's UL/DL RF paths to an optimum 1 of M server antenna port/antennas and 1 of N donor antenna port/antennas to provide an optimum antenna pair.

Figure 12:
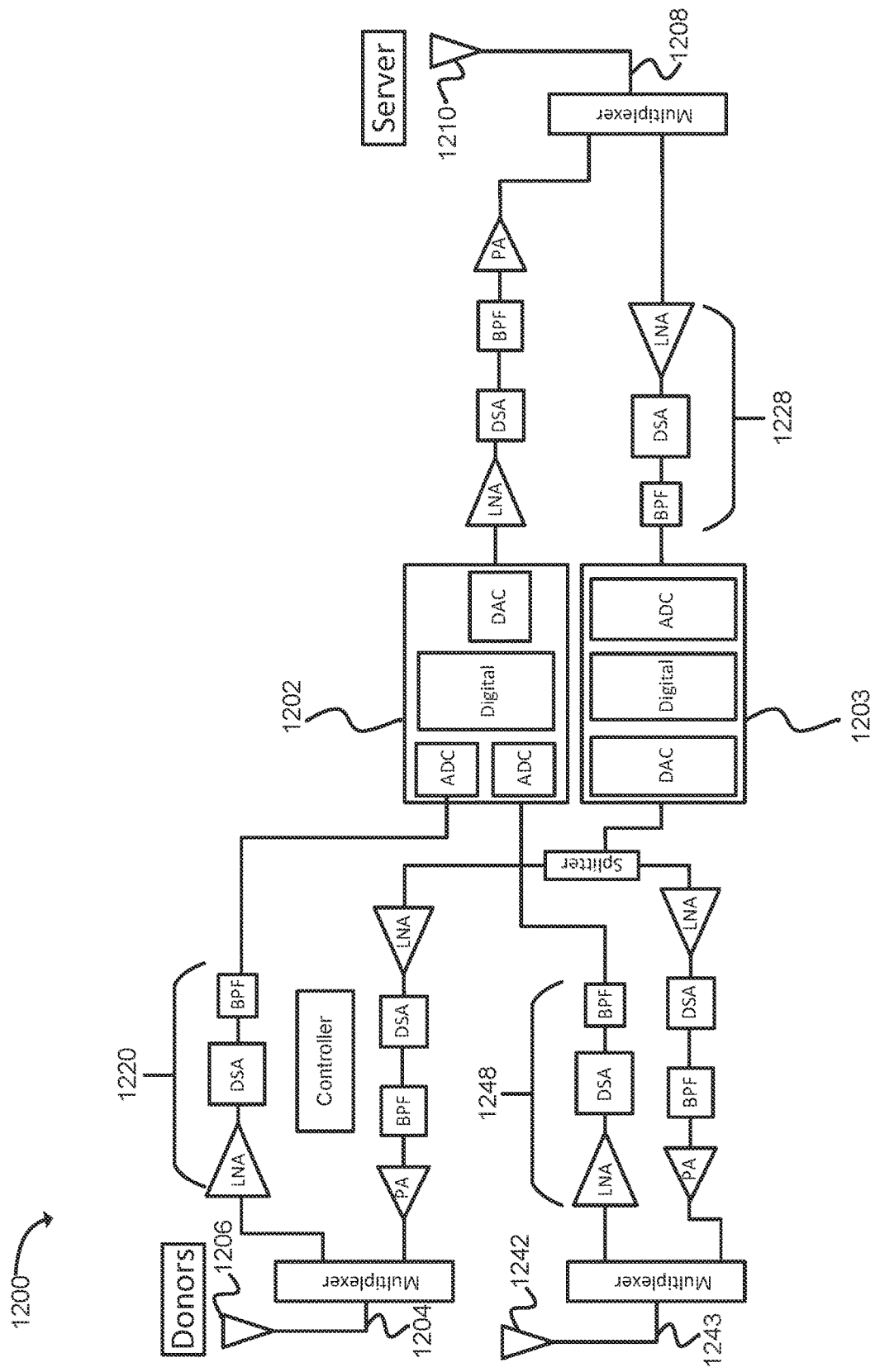
FIG. 12 illustrates a repeater having multiple combined DDCs configured for multiple donor antennas in accordance with an example.

FIG. 12 illustrates a repeater 1200 configured to receive broadband signals from a first donor antenna 1206 and a second donor antenna 1242. The example in FIG. 12 illustrates an architecture with a parallel downlink that can be combined at a common server port. A first receive amplification and filtering path 1220 is coupled to the first donor antenna via a first donor antenna port and a first ADC in a first DDC 1202. A second receive amplification and filtering path 1248 is coupled between an antenna port 1243 for the second donor antenna 1242 and a second ADC of the first DDC 1202. The use of separate ADCs allows the downlink signals from the separate donor antennas to be digitized separately. The channels in the signals can be sampled separately and interleaved after the DAC in the first DDC 1202. This can provide donor diversity, with a common server antenna 1210 which can simplify an installation of the repeater. A server receive amplification and filtering path 1228 can be coupled between a server antenna port 1208 and an ADC of a second DDC 1203. An uplink signal received at the server port can then be amplified and filtered before being digitized, digitally filtered in the second DDC 1203, converted to analog, and transmitted at one or both of the donor antennas. The use of two or more donor antennas can enable the repeater 1200 to be used for MIMO transmission with a MIMO capable base station. The example of FIG. 12 can use duplexers for two bands, or multiplexers for two or more bands, as previously discussed. Alternatively, signal splitters and bandpass filters can be used in place of the multiplexers or duplexers.

Figure 13:
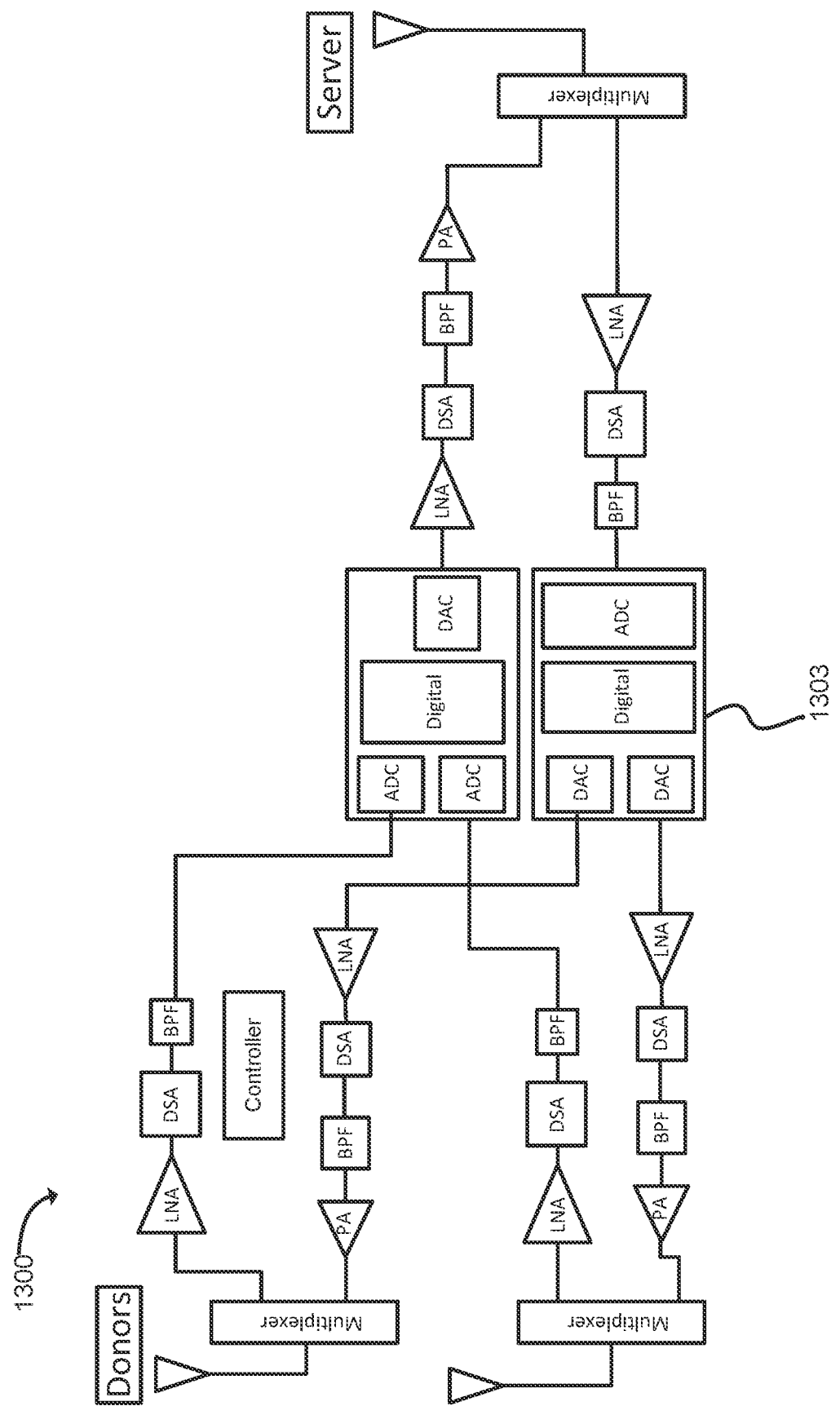
FIG. 13 illustrates a repeater having multiple combined DDCs with separate ADCs and separate digital to analog converters (DACs) in accordance with an example.

FIG. 13 illustrates an example of a repeater 1300 that is configured similarly to the repeater 1200 in FIG. 12. In the example of FIG. 13, the second DDC 1303 includes two separate DACs. This enables the uplink channel received at the server antenna to be directed to each donor antenna as desired. In one example, the uplink channel selection can mirror the downlink channel selection and interleaving. This architecture can improve network protection since on the desired signal is transmitted on each antenna. The use of two or more donor antennas can enable the repeater 1200 to be used for MIMO transmission with a MIMO capable base station. The example of FIG. 13 can use duplexers for two bands, or multiplexers for two or more bands, as previously discussed. Alternatively, signal splitters and bandpass filters can be used in place of the multiplexers or duplexers.

Figure 14:
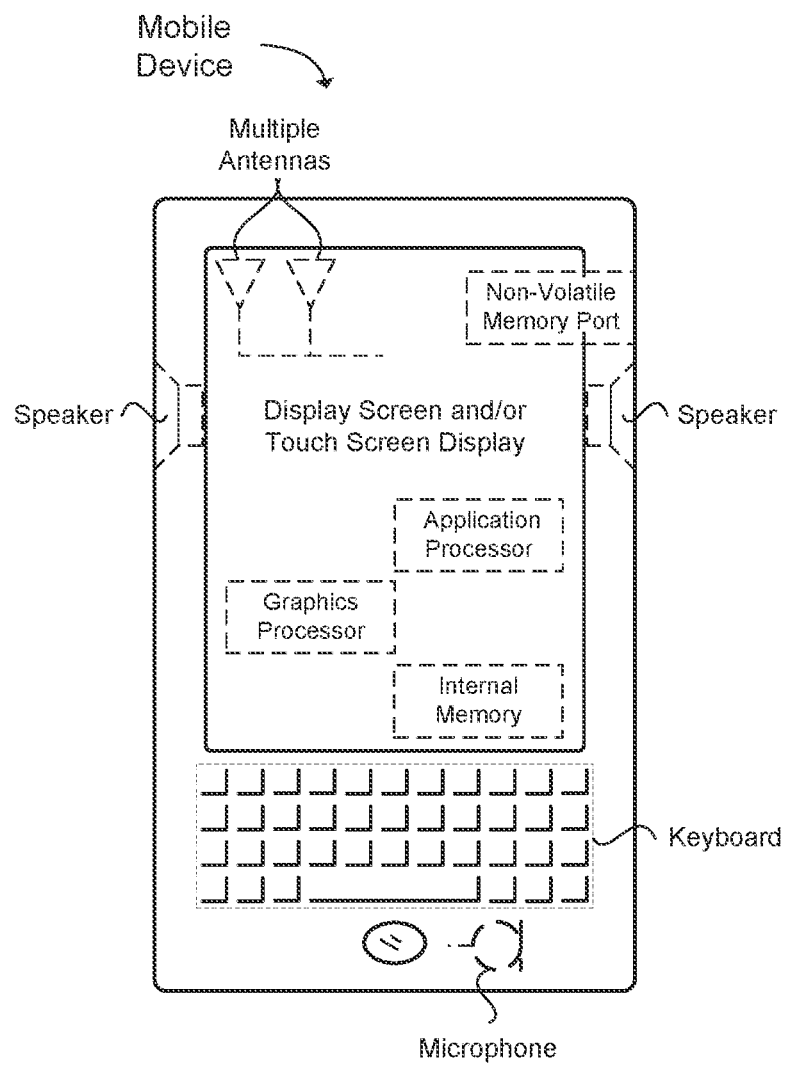
FIG. 14 illustrates a wireless device in accordance with an example.

FIG. 14 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater having a combined direct digital channelizer (DDC), comprising:
    a first antenna port configured to be coupled to a first antenna;
    a second antenna port configured to be coupled to a second antenna;
    a signal combiner (SC) comprising:
        a SC first input port coupled to the first antenna port;
        a SC second input port coupled to the second antenna port; and
        a SC output port configured to send a first radio frequency (RF) signal from the first antenna port and a second RF signal from the second antenna port to the DDC;
    a first antenna duplexer (1AD) comprising:
        an 1AD output port coupled to the SC first input port;
        an 1AD input port coupled to the SD second output port;
    an second antenna duplexer (2AD) comprising:
        a 2AD input port coupled to the SD first output port;
        a 2AD output port coupled to the SC second input port;
    the direct digital channelizer (DDC), comprising:
        an analog to digital converter (ADC) having an ADC input coupled to the SC output port and an ADC output, wherein the ADC is configured to directly sample the first RF signal and the second RF signal to form a combined digital signal;
        a digital processor having a processor input coupled to the ADC output and a processor output, the digital processor configured to process the combined digital signal; and
        a digital to analog converter (DAC) with a DAC input coupled to the processor output and a DAC output port configured to convert the processed combined digital signal to a processed first RF signal and a processed second RF signal; and
    a signal divider (SD) comprising:
        an SD input port coupled to the DAC output port;
        an SD first output port coupled to the second antenna port that is configured to send the processed first RF signal for transmission at the second antenna; and
        an SD second output port coupled to the first antenna port that is configured to send the processed second RF signal for transmission at the first antenna.

2. The repeater of claim 1, wherein the SD is one or more of a signal splitter, a duplexer, a multiplexer, a circulator, or a bandpass filter and the SC is one or more of a signal splitter, a duplexer, a multiplexer, a circulator, or a bandpass filter.

3. The repeater of claim 1, further comprising an RF amplifier coupled between the DAC output port and the SD input port.

4. The repeater of claim 1, the first antenna duplexer (1AD) further comprising:
the 1AD output port coupled to the SC first input port;
the 1AD input port coupled to the SD second output port; and
a 1AD bidirectional port coupled to the first antenna port.

5. The repeater of claim 4, further comprising a first direction receive amplification and filtering path coupled between the 1AD output port and the first SC input port, wherein the first direction receive amplification and filtering path comprises:
a low noise amplifier;
a variable attenuator; and
a bandpass filter.

6. The repeater of claim 4, further comprising a second direction transmit amplification and filtering path coupled between the 1AD input port and the SD second output port, wherein the second direction transmit amplification and filtering path comprises:
a variable attenuator;
a bandpass filter; and
a power amplifier.

7. The repeater of claim 1, the second antenna duplexer (2AD) further comprising:
the 2AD input port coupled to the SD first output port;
the 2AD output port coupled to the SC second input port; and
a 2AD bidirectional port coupled to the second antenna port.

8. The repeater of claim 7, further comprising a first direction transmit amplification and filtering path coupled between the SD first output port and the 2AD input port, wherein the first direction transmit amplification and filtering path comprises:
a variable attenuator;
a bandpass filter; and
a power amplifier.

9. The repeater of claim 7, further comprising a second direction receive amplification and filtering path coupled between the 2AD output port and the second SC input port, wherein the second direction receive amplification and filtering path comprises:
a low noise amplifier;
a variable attenuator; and
a bandpass filter.

10. The repeater of claim 1, wherein the DDC is further configured to:
apply a first plurality of filters to the first RF signal to:
filter the first RF signal over a first selected band; or
form one or more first channelized signals from the first RF signal; and
apply a second plurality of filters to the second RF signal to:
filter the second RF signal over a second selected band; or
form one or more second channelized signals from the second RF signal.

11. The repeater of claim 1, wherein the DDC is further configured to:
apply an amplitude equalization to one or more of the first channelized paths; and
apply the amplitude equalization to one or more of the second channelized paths.

12. The repeater of claim 1, wherein the first RF signal is a first direction signal and the second RF signal is a second direction signal.

* * * * *